United States Patent [19]

Lustwerk

[11] Patent Number: 4,927,337
[45] Date of Patent: May 22, 1990

[54] MAGNETICALLY DRIVEN PUMP

[76] Inventor: Ferdinand Lustwerk, Page Rd., Lincoln, Mass. 01773

[21] Appl. No.: 202,270

[22] Filed: Jun. 6, 1988

Related U.S. Application Data

[63] Continuation of Ser. No. 904,409, Sep. 8, 1986, abandoned.

[51] Int. Cl.$^5$ .............................................. F04B 17/00
[52] U.S. Cl. ..................................... 417/420; 310/104
[58] Field of Search ................. 417/410, 420; 310/104

[56] References Cited

U.S. PATENT DOCUMENTS 2,669,668 2/1954 Okulitch ................................ 263/3

Primary Examiner—Louis J. Casaregola
Assistant Examiner—Timothy S. Thorpe
Attorney, Agent, or Firm—Robert T. Dunn

[57] ABSTRACT

A magnetically driven centrifugal pump includes a sealed housing enclosing a magnetically driven rotor on an axle of rotation contained within the housing, the axle being attached to the back inside wall of the housing and extending therefrom into the rotor, the rotor having impellers attached to the face thereof toward the front of the housing, the impellers defining radial fluid passages leading from the axial center of the front of the housing to the periphery of the housing and the rotor having radially oriented magnets in the back face thereof for coupling with similarly oriented magnets in an external magnetic drive, whereby the axial dimension of the rotor need be only the width of a radial magnet plus the axial projection of an impeller and the axial dimension of the sealed housing may be only slightly greater than the axial dimension of the rotor and may be substantially less than the radial diameter thereof. In operation, fluid enters an axial input port at the front of the housing and discharges from an output port at the periphery of the housing and the external magnetic drive magnetically couples with the rotor through the back wall of the housing. In a preferred embodiment, the impellers are radially extending ridges on the front face of the rotor and a disk-shaped plate attaches to and covers the impellers defining each radial passage between adjacent ridges, the face of the rotor and the covering plate.

11 Claims, 2 Drawing Sheets

MAGNETICALLY DRIVEN PUMP

This is a continuation of application Ser. No. 904,409, filed Sept. 8, 1986, now abandoned.

BACKGROUND OF THE INVENTION

The present invention relates to magnetically driven centrifugal fluid pumps and particularly to pumps of the sort that have no rotating axle or bearings that penetrate a wall of the pump housing and so the housing is completely sealed against any leakage of the fluid that is pumped and there is no requirement of seals against leakage of the fluid at any moving or rotating part of the pump.

Heretofore, magnetically driven centrifugal pumps that are completely sealed up and have no drive shaft or bearing opening through any wall of the housing of the pump have been provided. Such pumps are often specified where, for any number of reasons, no fluid leakage from the pump can be tolerated. For example: the fluid may be very contaminating; or it may be poisonous or radioactive; or it may simply be a cooling fluid in a closed system that cannot tolerate any leaks. For any of these reasons, magnetically driven pumps have been provided in which the drive to the rotor of the pump is by magnetic coupling through a wall of the pump housing and so there need not be any drive shaft or bearing that penetrate the wall of the pump housing.

The usual form of magnetically driven pumps is the axial magnetic drive pump, which has a rotor within the sealed housing on an axle that is attached to the back inside wall of the housing. The rotor carries several axially oriented magnets behind the impellers and extending from behind the impellers face at the front of the rotor to the back of the rotor. Hence, the back of the rotor is an elongated cylinder that contains several axial magnets arranged regularly around and parallel to the rotor axis of rotation; and the impellers are contained in a disc of substantially larger diameter than the elongated cylinder. A housing encloses the rotor and has the same shape so that the axial magnets of the rotor are close to the inside wall of the housing. The external drive magnetic encloses the elongated cylinder of the housing and is, essentially, a thick walled cylinder containing axially oriented magnets in the thick wall. Thus, the external drive and the rotor axial magnets are concentric. The fields of the external drive axial magnets and the rotor axial magnets couple through the walls of the elongated cylindrical part of the housing and so the direction of the coupling magnetic fields through the housing wall is essentially radial.

The fluid input of such a pump is along the axis and may be into an annular input chamber at the front inside of the housing and from that chamber into rotating radial passages that are partly defined by the impellers attached to the rotor. The fluid is trapped in these rotating radial passages between the impellers and the immediately adjacent front inside wall of the housing and is compelled to flow radially into a peripheral annular output chamber within the housing. Clearly, the pressure of fluid at the input chamber is the input pressure and the pressure at the peripheral annular chamber is the output pressure and the effect of the rotation is to increase the output pressure over the input pressure even while there is a continuous flow of fluid into the input and out of the output. Such pumps are rated by the relationship of flow volume to pressure head. As the flow volume increases the pressure head decreases (maximum pressure head is achieved at zero flow).

Clearly, the axial magnet orientation requires a rotor with an elongated axial part for containing the axial magnets and the axle for such a rotor may have to be supported at both ends. It is difficult to carry such a rotor on an axle that is supported at only one end (cantilevered from one end of the inside of the housing). However, the cantilevered axle is preferred so that the front face of the rotor that carries the impellers has no axle between it and the opposite wall (front inside wall) of the housing as this allows a fluid input along the axis of rotation directly into the center of the impeller face of the rotor. The present invention incorporates a different orientation of the rotor and drive magnets to substantially reduce the axial dimension of the rotor so that it can be easily supported by an axle at the back inside face of the housing and needs no axial support at the front inside face of the housing.

For such pumps where the impeller blades are on the front face of the rotor, the radial fluid passages are between the blades and each passage is defined by adjacent blades, the face of the rotor and the immediately opposite front inside wall of the housing; and there is clearance between the impellers and the housing so that the impellers do not scrape or touch the housing. Since the stationary housing wall is a part of each radial passage, there is a great deal of friction on the fluid where it contacts the front inside housing wall as the fluid is caught by the impellers and rotated so that it flows rotationally and outward from the axial input to the peripheral output. This friction results only in heating the fluid and is to be avoided. The embodiment of the present invention also incorporates another improvement to a centrifugal pump of this sort, that tends to reduce the forces of friction on the fluid as it flows radially as it is driven by the impellers from the axial input to the peripheral output.

SUMMARY OF THE INVENTION

It is an object of the present invention to provide an improved magnetically driven pump wherein the axial dimension of the rotor need be only the width (rather than the length) of a rotor magnet plus the axial projection of an impeller and the axial dimension of the sealed housing need be only slightly greater and may be substantially less than the radial diameter thereof, so that the rotor can be mounted on an axle attached only to the back inside wall of the housing.

It is a further object to provide an improved magnetically driven pump of the type wherein the rotor axle is attached at only one end thereof to the inside walls of the housing.

It is a further object to provide an improved magnetically driven pump of the type wherein the fluid input can be along the axis of rotation of the rotor at the front of the pump housing.

It is another object of the present invention to provide a centrifugal pump wherein the friction losses that arise when fluid is radially driven by the pump rotor against the stationary inside wall of the housing are reduced or avoided.

It is a further object to provide such a centrifugal pump wherein closed radial passages are provided in the pump rotor leading from the axial input of the pump to the peripheral output so that fluid flowing through such closed radial passages does not flow against the stationary inside walls of the pump housing.

According to the present invention, a magnetically driven centrifugal pump includes a sealed housing enclosing a magnetically driven rotor on an axle of rotation contained within the housing, the axle being attached to the back inside wall of the housing and extending therefrom into the rotor and so the rotor is cantilevered from the back inside wall of the housing. The rotor has impellers attached to the face thereof toward the front of the housing and has radially oriented magnets attached to the back thereof. The impellers define radial fluid passages leading from the axial center of the front of the housing to the periphery of the housing. An axial input fluid port is at the front of the housing and an output fluid port is at the periphery of the housing. The rotor drive includes several radially oriented magnets outside of the housing magnetically coupled through the walls of the housing with the rotor magnets inside the housing. In operation, rotation of the external drive rotates the rotor causing fluid to flow from the input to the output increasing the pressure of the fluid at the output with respect to the pressure of the fluid at the input.

In a preferred embodiment, the radially oriented rotor magnets are equally angularly spaced in the back face of the rotor, close to the back inside wall of the housing and the external drive magnets are similarly arranged and close to the back outside wall of the housing. Also, the impellers are radially extending ridges on the front face of the rotor and extend toward the fluid input and a disk-shaped plate with an opening at the center covers the impellers defining the radial passages between adjacent ridges, the face of the rotor and the covering plate.

These and other objects and features of the present invention will be apparent to those skilled in the art from the following specific description of embodiments of the invention taken in conjunction with the drawings.

DESCRIPTION OF EMBODIMENT OF THE INVENTION

Figure 1:
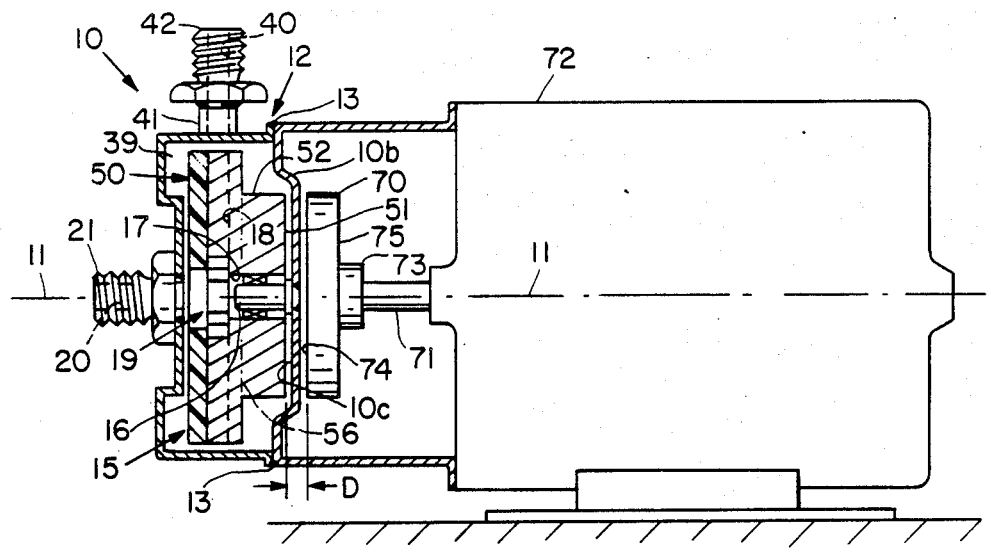
FIG. 1 is a side partially cross section view of a radial magnetic drive pump according to the present invention of which the pump and a portion of the outside magnetic drive are shown in cross section to reveal the inner parts thereof while the drive motor is shown in side elevation.
Figure 2:
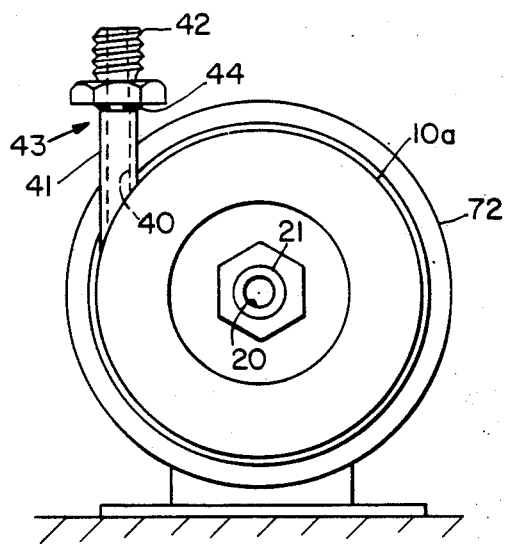
FIG. 2 is a front end view of the pump showing the axial fluid input and the peripheral fluid output with conventional seamless tube couplings attached thereto.

A magnetic drive pump with radially oriented rotor and external drive magnets is shown in the drawings. This is the preferred embodiment of the invention and has the rotor axle attached at one end only to the inside of the housing and so the axle and rotor are carried totally at the one inside wall of the housing herein referred to as the back wall, because it is toward the outside drive and is opposite to the axial fluid input of the pump. This pump includes all features of the present invention and represents the best known use of the invention.

As shown in FIG. 1, the pump housing 10 is essentially a figure of revolution about the pump axis 11. The housing is formed in two parts, the front part 10a and the back part 10b. Both of these parts are figures of revolution as shown in FIG. 1 and they attach together at their peripheries at 12 by, for example, a seam of weld 13 and so form the complete housing. Clearly, weld seam 13 seals the housing at least at its periphery so that it does not leak.

Contained within the housing is the rotor structure 15 suspended from the back inside wall 10c on axle 16. Axle 16 projects through an axial hole 17 through the rotor to the front face 18 of the rotor that opens into an axial fluid input chamber 19, immediately at the input passage 20 defined by fluid input fitting 21 which is a conventional threaded fitting for seamless tubing having a tubular part 21a projecting through an input hole 22 (see FIG. 7) in the front housing 10a. Fitting 21 is sealed to the housing at 23 by, for example, weld seam 23.

The impeller vanes 31 to 36 are ridges on the face 18 of the rotor and may be an integral unitary part of the rotor. The impeller ridges are of uniform height and equally angularly spaced about the rotor face and define radial expanding passages that lead from the axial chamber 19 to the annular peripheral chamber 39 within the pump housing from which the fluid output passage 40 leads. The fluid output passage may be, for example, a short length of tubing 41 leading tangentially from annular chamber 39 and having a conventional tube fitting 42 attached to the end and sealed thereto at 43 by weld seam 44.

Figures 3, 4:
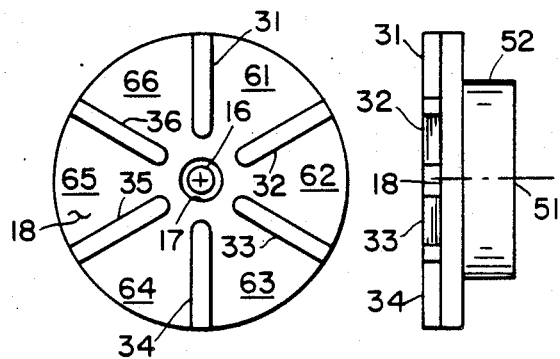
FIG. 3 is a front view of the rotor showing the impeller ridges on the front face thereof.
FIG. 4 is a side view of the rotor showing the impeller ridges from the side and the radially oriented permanent magnets thereof for magnetic coupling to an external drive carrying magnets that are similarly oriented.

As shown in FIG. 3, the impeller ridges 31 to 36 define expanding radial passages 61 to 66 which are entirely formed within the rotor. They are formed by ridges 31 to 36, face 18 of the rotor and the rotor cover plate 50. FIG. 3 shows face 18 of the rotor and impeller ridges 31 to 36 with cover plate 50 removed. Clearly, the radial passages 61 to 66 are each defined by two of the ridges and the passages are radially expanding. When the cover plate is affixed to the ridges as shown in FIG. 1 and shown partially in FIG. 7, passages 61 to 66 are each totally enclosed and contained in the rotor and so the fluid that flows through those passages does not flow also against the stationary front wall of the housing and is not subject to the friction forces of such flow.

Figure 7:
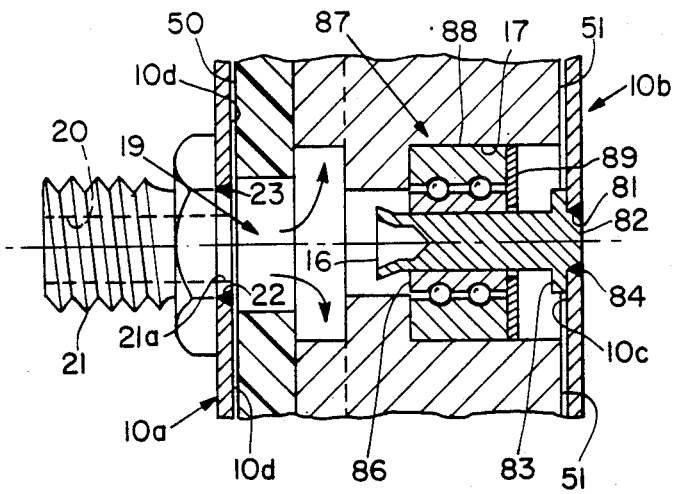
FIG. 7 is a side cross section view of the pump showing a portion thereof enlarged to reveal details of the rotor axle, bearing, axle attachment to the housing and fluid input chamber into the closed radial passages through the rotor defined by the impellers, rotor face and impeller cover plate.
Figure 8:
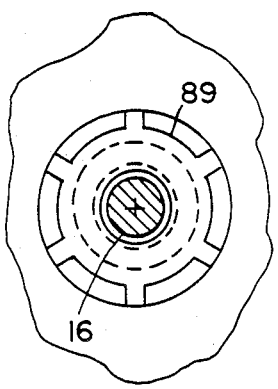
FIG. 8 is an enlarged back end view of the rotor axle and bearing showing the bearing retainer.
Figure 9:
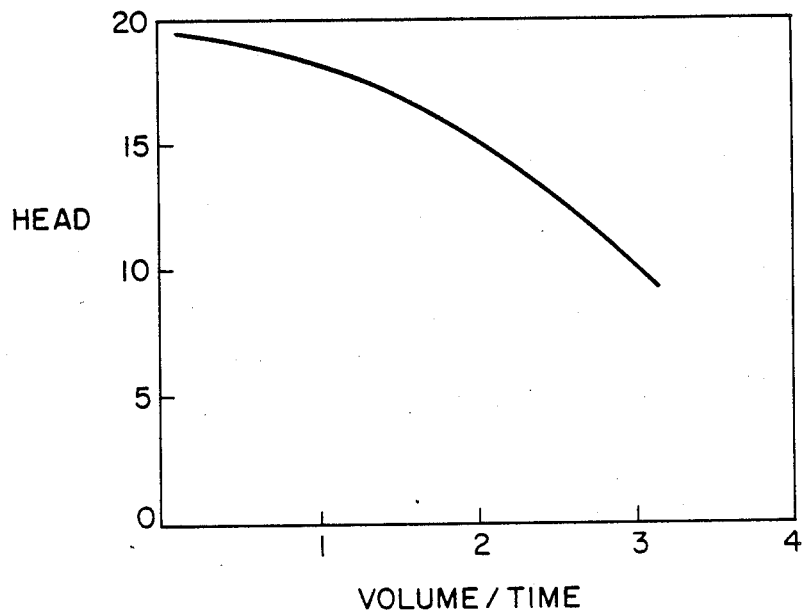
FIG. 9 is a plot of the pump pressure head versus flow rate for a typical centrifugal pump according to the present invention.

FIG. 7 is an enlarged view of the rotor showing details of the axle, bearing and portions of the rotor that are carried by the axle. It also shows cover plate 50, input axial chamber 19 into which fluid enters from input port 20 and the entrance to radial passages 61 to 66 defined by the rotor face, impeller ridges and cover plate. As shown in FIGS. 7 and 8, axle 16 is fixed to the back part 10b of the housing. More particularly it extends from the inside wall 10c of the back part of the housing. In order to secure the axle to the housing, an axial hole 81 may be provided through the housing through which a short hub 82 of the axle projects up to shoulder 83 and is secured to the housing by weld seam 84 so that the axle is sealed where it is welded to the housing.

Within the housing, axle 16 carries the inner race 86 of ballbearing 87 and the outer race 88 is attached to the rotor axial passage 17. A bearing retainer disk 89 is forced into the axial passage 17 from the backside thereof against the bearing to hold it in place.

Figure 5:
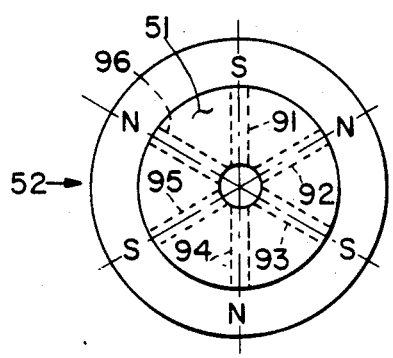
FIG. 5 is a rear view of the rotor, showing in broken lines the orientation of permanent magnets embedded therein.

FIG. 5 shows the rear face of the rotor that contains the radially oriented magnets. As shown the individual magnets are indicated by broken lines. Six such magnets denoted 91 to 96 are formed in the rear cylindrical part 52 of the rotor. These magnets are oriented with their poles alternately reversed and so the outermost pole of magnet 91 is a south (S) while the outermost pole of the next magnet 92 is a north (N).

The entire rotor body may be formed of a polymer like nylon in which barium ferrite particles are embedded. The particles are lined up magnetically by an applied magnetic field of appropriate strength and direction before the polymer sets and while the polymer is still fluid and the particles can be oriented in it by the applied magnetic field. Then when the polymer sets, the particles are aligned to form the magnets in it as shown in FIG. 5.

Figure 6:
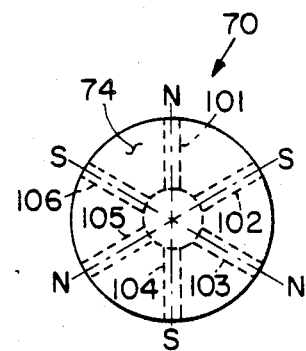
FIG. 6 is a front view of the external drive showing in broken lines the magnets embedded therein.

The drive magnet 70 is formed in a similar way and is shown in FIG. 6. Here the radial orientation of magnets 101 to 106 are also formed with their poles alternately reversed and they are spaced to register with magnets 91 to 96 of the rotor. When such a drive magnet as 70 and rotor 50 are positioned with their faces 51 and 74 opposed, the magnets 91 to 96 and 101 to 106 will lock them together at any angular position where the N poles of one are individually opposite the S poles of the other.

Such rotor and drive magnets made of a polymer like nylon containing barium ferrite particles that are lined up magnetically before the polymer sets, can be obtained from Xolox Corporation of Fort Wayne, Ind.

In operation, the pump shown in FIGS. 1 to 6 is driven by external drive magnet 70 attached to the drive shaft 71 of electric drive motor 72. The force of attraction between the rotor and drive magnets is generally parallel to axis 11 and is strongest when the gap represented by dimension D between the adjacent faces of the magnets is least, and the force diminishes as the gap increases. In order to ensure the greatest attraction force between the two magnets, the rear plate 10b of the housing is made of non-magnetic material such as stainless steel.

Neither magnet face should touch the housing, because they both rotate and such contact would create a great deal of friction and unnecessarily wear the housing and the magnet and so in practice both faces are positioned very close to the immediately adjacent housing wall, but do not touch the wall. The gap D between the adjacent faces of the magnets could be varied to vary the magnetic drive coupling. This could be done most readily by moving the drive magnet 70 axially on its hub and for that purpose the hub and magnet may be adapted so that the position of the magnet on the hub can be changed.

In operation, drive magnet 70 is driven in rotation by motor 72, and by magnetic coupling drives rotor 15 at the same speed. As a rotor starts up rotation, fluid within the axial passages 61 to 66 immediately rotates with the rotor while fluid between the cover plate 50 of the rotor and the front inside wall 10d of the housing tends to cling to the housing wall and so remain stationary. In order to reduce fluid friction between cover plate 50 and wall 10d, the cover plate may be made of a material that offers relatively low surface tension to the liquid that is being pumped. For example, the cover plate may be made of teflon and so the fluid in the space between the cover and the inside of the housing will tend to cling to the housing and slip from the surface of the cover. However, fluid within the passages 61 to 66 will be rotated at high speed with the rotor and will flow under centrifugal force from input chamber 19 to output chamber 39 and out of tangential output passage 40.

In operation, some higher pressure fluid in output chamber 39 may tend to flow radially around the rotor toward input chamber 19 through the narrow passage between cover plate 50 and inside housing wall 10d at the front and so there will be some leakage of the high pressure fluid back into the low pressure input chamber. That leakage can be minimized by reducing the space between cover plate 50 and inside wall 10b at the front of the housing. Furthermore, as already mentioned, there will be a minimum of friction energy imparted to that leakage fluid from the cover plate 50 due to the low friction surface of the cover plate even though the cover plate is rotating at high speed as part of the rotor.

Thus, the rotor including features according to the present invention can be readily made of two pieces, one including the magnets, face plate 18 and impeller ridges 31 to 36 and the other piece being the teflon cover plate 50. In fact, the first piece can be a unitary piece of molded polymer containing magnetic particles as described; and so the entire rotor can be made in two pieces that may be attached together by epoxy or other adhesive.

CONCLUSIONS

The principal feature of the present invention is that the rotor of the magnetically drived centrifugal pump has radially oriented magnets in the back face thereof for coupling with similarly oriented magnets in an external magnetic drive. As a result, the axial dimension (length) of the rotor is determined principally by the width of a radial magnet plus the axial projection of an impeller and so can be made small as compared with the radial diameter of the rotor. This structure allows the rotor to be suspended on its axle attached only to the back wall of the housing (cantilevered). This feature has clear advantage to a magnetically driven centrifugal pump and can be used on such a pump whether it has a rotor axle suspended at one end only or suspended at both ends.

According to another feature incorporated in the preferred embodiment described herein, the rotor impellers are radially extending ridges on the front face of the rotor and a disk-shaped plate attaches to and covers the inpellers defining each radial passage between adjacent ridges, the face of the rotor and the covering plate. This feature provides radial passages in the rotor in which the pumped fluid pressure is increased that are entirely contained in the rotor and rotate with the rotor and so radial fluid flow is not against a static wall within the pump housing.

Clearly, these features may be applied to other fluid pumps than the pump described herein without deviating from the spirit and scope of the invention as set forth in the appended claims.

What is claimed is:

1. A magnetically driven centrifugal pump comprising,
   (a) a magnetically driven rotor having a front face and a back face,
   (b) a sealed housing enclosing said rotor and having a front wall, a back wall and a peripheral wall,
   (c) said rotor being carried on an axle inside said housing, said axle being attached at one end thereof only to said housing back inside wall so that said rotor rotates freely on said axle, which defines an axis of rotation of said rotor, and extends cantilevered from said housing back inside wall, the rotor back face being adjacent said housing back inside wall and said rotor front face being adjacent said housing front inside wall,
   (d) fluid impellers attached to said rotor that extend generally radially from said axis of rotation in the space between said rotor front face and said housing front inside wall,
   (e) a fluid input passage through said housing front wall for fluid flow into said housing,
   (f) a fluid output passage for fluid flow out of said housing through said peripheral wall,
   (g) one or more straight permanent rotor magnets carried on said rotor and oriented thereon each with its north (N) and its south (S) magnetic poles on the same radial line from said axis of rotation,
   (h) means external of said housing that magnetically couples with said rotor magnet through at least one wall of said housing including one or more external drive magnets oriented therein each with its north (N) and its south (S) magnetic poles on the same radial line from said axis of rotation and said external drive magnets and said rotor magnets polarities are oriented so that each drive magnet exerts a magnetic force of attraction on a rotor magnet and said force of attraction is generally parallel to said axis of rotation and
   (i) means for driving said coupling means in rotation,
   (j) whereby said driving means drives said rotor impellers which compels fluid flow from said input passage to said output passage.

2. A pump as in claim 1 wherein said rotor material contains magnetically polarized particles uniformally distributed therein that are magnetically oriented therein, radially from said axis of rotation, thereby forming said straight permanent rotor magnets.

3. A pump as in claim 1 wherein said straight permanent drive magnets are arranged with regular angular spacing therebetween on said drive means.

4. A pump as in claim 1 wherein,
   (a) said magnetic force of attraction tends to urge said rotor back face against said housing back inside wall and said drive magnet is adjacent the outside of said housing back wall and
   (b) means are provided inside said housing for holding said rotor back face away from said housing back inside wall.

5. A pump as in claim 4 wherein,
   (a) said means provided for holding said external magnet away from said housing back wall is such that,
   (b) neither said rotor or said drive magnet touch said housing back wall and there is a gap of low magnetic permeability material between said rotor magnet and said drive magnet.

6. A pump as in claim 1 wherein,
   (a) said fluid input passage through said housing front wall is located axially with respect to said axis of rotation and
   (b) said fluid output passage connects to a peripheral space within said housing through said peripheral wall.

7. A pump as in claim 1 wherein means are provided within said housing, fixedly attached to said rotor fluid impellers, which together with said impellers defines at least one rotating enclosed fluid path extending radially from said axis of rotation to a peripheral space within said housing.

8. A pump as in claim 7 wherein said fluid output passage is aligned with the output ends of said radial fluid paths.

9. A pump as in claim 7 wherein said fluid output passage is directed tangentially from said outer peripheral space within said housing.

10. A pump as in claim 1 wherein,
    (a) said fluid impellers are on the same side of said rotor as said fluid input passage and
    (b) means are provided within said housing fixedly attached to said impellers, which together with said impellers define at least one rotating enclosed fluid path directed radially from said axis of rotation from said fluid input to said fluid output passage.

11. A pump as in claim 10 wherein,
    (a) said impellers are radially extending ridges on said rotor front face,
    (b) said last mentioned means covers said ridges defining said radial fluid passages as the space between adjacent ridges, said rotor front face and said cover and
    (c) an axial opening in said cover defines an extension of said fluid input passage into said radial fluid paths.

* * * * *